United States Patent
Ramos

(10) Patent No.: US 6,730,273 B1
(45) Date of Patent: May 4, 2004

(54) CATALYTIC CONVERTER UNIT WITH DIRT PRE-FILTER

(75) Inventor: Elliot D. Ramos, Rochester, NY (US)

(73) Assignee: Xerox Corporation, Rochester, NY (US)

( * ) Notice: Subject to any disclaimer, the term of this patent is extended or adjusted under 35 U.S.C. 154(b) by 0 days.

(21) Appl. No.: 09/453,083

(22) Filed: Dec. 2, 1999

(51) Int. Cl.$^7$ .................. B01D 53/34; B01D 39/00
(52) U.S. Cl. ............... 422/171; 422/177; 422/181
(58) Field of Search ................ 422/171, 177, 422/180, 181, 218

(56) References Cited

U.S. PATENT DOCUMENTS

| | | | | |
|---|---|---|---|---|
| 3,051,561 A | * | 8/1962 | Grimes | 422/218 |
| 3,556,735 A | * | 1/1971 | Epelman | 422/171 |
| 3,685,972 A | * | 8/1972 | De Palma et al. | 422/181 |
| 3,691,097 A | * | 9/1972 | Stiles et al. | 502/241 |
| 3,983,393 A | | 9/1976 | Thettu et al. | 250/326 |
| 4,143,118 A | | 3/1979 | Laing | 423/210 |
| 4,315,837 A | | 2/1982 | Rourke et al. | 252/430 |
| 4,374,095 A | * | 2/1983 | Legg et al. | 422/218 |
| 4,388,274 A | | 6/1983 | Rourke et al. | 422/177 |
| 5,000,438 A | | 3/1991 | Sardano et al. | 271/264 |
| 5,424,806 A | | 6/1995 | Siegel | 355/200 |

* cited by examiner

Primary Examiner—Hien Tran
(74) Attorney, Agent, or Firm—Perman & Green, LLP

(57) ABSTRACT

A catalytic converter unit for pre-filtering dirt particles from a gas discharge containing an ozone-laden gas discharge from electrographic copy machines, in advance of the passage of the gas discharge through a gas-neutralizing catalyst bed, to exclude the passage of the dirt particles which can cause contamination and degradation of the catalyst, and plugging of the catalyst bed resulting in reduced gas-permeability and the creation of a significant pressure drop thereacross which interferes with or substantially reduces the rate of gas flow through the unit. The catalytic converter units incorporate an easily-removable, cleanable and/or replaceable dirt filter screen which is supported for simple removal from the unit for periodic cleaning or replacement.

3 Claims, 4 Drawing Sheets

CATALYTIC CONVERTER UNIT WITH DIRT PRE-FILTER

BACKGROUND OF THE INVENTION

1. Field of the Invention

The present invention relates to the well-known problem of generation of objectionable toxic or dangerous gases by equipment, particularly ozone gas generation by electrostatic imaging machines, and provides a convenient filter/catalytic converter unit which facilitates the simple cleaning or replacement of a dirt pre-filter element, as necessary, to protect the gas-neutralizing catalyst for the life of the machine.

As is well known, ozone gas is generated in electrostatographic copying equipment as a result of corona discharge during sensitization of the recording surface of the photosensitive member. This is also true of other stations within the copier which employ corona discharge devices. Ozone emissions into the surrounding machine environment are controlled by catalytic "filtering" devices capable of conversion of the ozone to relatively harmless substances and are located in the copier exhaust stream. These filters are generally characterized as fixed-bed devices; that is, the catalyst is impregnated into a porous substrate which is integrated within the copier exhaust housing or is incorporated into the corona discharge electrode structure itself. Each type of ozone control system described hereinabove is limited in its ability to neutralize the ozone due to the physical constraints placed upon the catalysts containing element.

As will be appreciated, the amount of exposure of the ozone laden vapors to the catalyst determines the capacity and efficiency of ozone neutralization by the catalyst-containing element. Where the catalyst is entrained within or coated upon a porous or fibrous support, ozone laden vapors must be capable of penetration of this structure for contact with the catalyst. This presents problems since ozone laden exhaust produced by electrostatic copiers also contains numerous "dirt" particulates or contaminants (e.g. toner, paper fragments, etc.) These particulates can pass with the ozone laden exhaust to the catalyst support and, after a relatively brief period, impregnate the support material thereby diminishing the porosity of the catalyst- containing element. As the porosity of the support decreases, so too does the amount of catalyst accessible to the ozone-laden vapors. This can require frequent replacement of the catalyst-containing element or some sacrifice in the completeness of exhaust treatment in order to extend catalytic activity of the "filtering" device.

These considerations also apply to the neutralizing of other objectionable, toxic and dangerous gases such as carbon monoxide, nitrogen oxides and similar gases by known catalyst beds whereby it is desirable to filter dirt contaminants from the discharge before it contacts the catalyst bed.

2. State of the Art

U.S. Pat. No. 4,143,118 discloses an electrographic apparatus incorporating a catalyst-impregnated filter screen associated with a corotron and heater element to achieve in-situ ozone pre-neutralization prior to the transmission of the exhaust gas to an ozone-neutralization unit having a granular catalyst bed filter. Back-flushing is required to remove entrapped particles from blocking the outlet end of the unit and creating a substantial pressure drop.

U.S. Pat. No. 4,315,837 discloses an electrographic apparatus incorporating a composite support matrix, such as glass beads, coated with ozone-neutralizing catalyst to form a filter element within the exhaust conduit of the apparatus. The catalyst matrix is held in place, at each end, by a foraminous member which permits passage of the exhaust gas and retention of the composite catalyst matrix without appreciable pressure drop thereacross. The foraminous member is in contact with the composite catalyst matrix, not easily separable therefrom for cleaning or replacement, and not indicated to be a dirt filter.

U.S. Pat. No. 4,388,274 discloses an electrographic copying machine incorporating an exhaust system for transporting the ozone-laden gas from each of the corona stations to an ozone-neutralizing filter unit containing a thin layer of ozone-decomposing catalyst retained between foraminous screens. The screens confine the catalyst bed and are not separable therefrom for cleaning or replacement nor are they disclosed to function as dirt filters.

SUMMARY OF THE INVENTION

The present invention provides a novel, convenient catalytic converter unit for pre-filtering dirt particles from a gas discharge containing an objectionable, neutralizable gas component, such as the ozone-laden gas discharge from electrographic copy machines in advance of the passage of the gas discharge through a gas-neutralizing catalyst bed, to exclude the passage of the dirt particles onto or into the catalyst bed where they can cause contamination and degradation of the catalyst, and plugging of the catalyst bed resulting in reduced gas-permability and the creation of a significant pressure drop thereacross which interferes with or substantially reduces the rate of gas flow through the unit.

The present catalytic converter units incorporate an easily-removable, cleanable and/or and replaceable dirt filter element having a dirt-trapping mesh which is upstream of, closely-spaced from, the catalyst bed and is supported for simple removal from the unit for periodic cleaning or replacement without interfering with the catalyst bed.

THE DRAWINGS

DETAILED DESCRIPTION OF THE INVENTION

Figure 1:
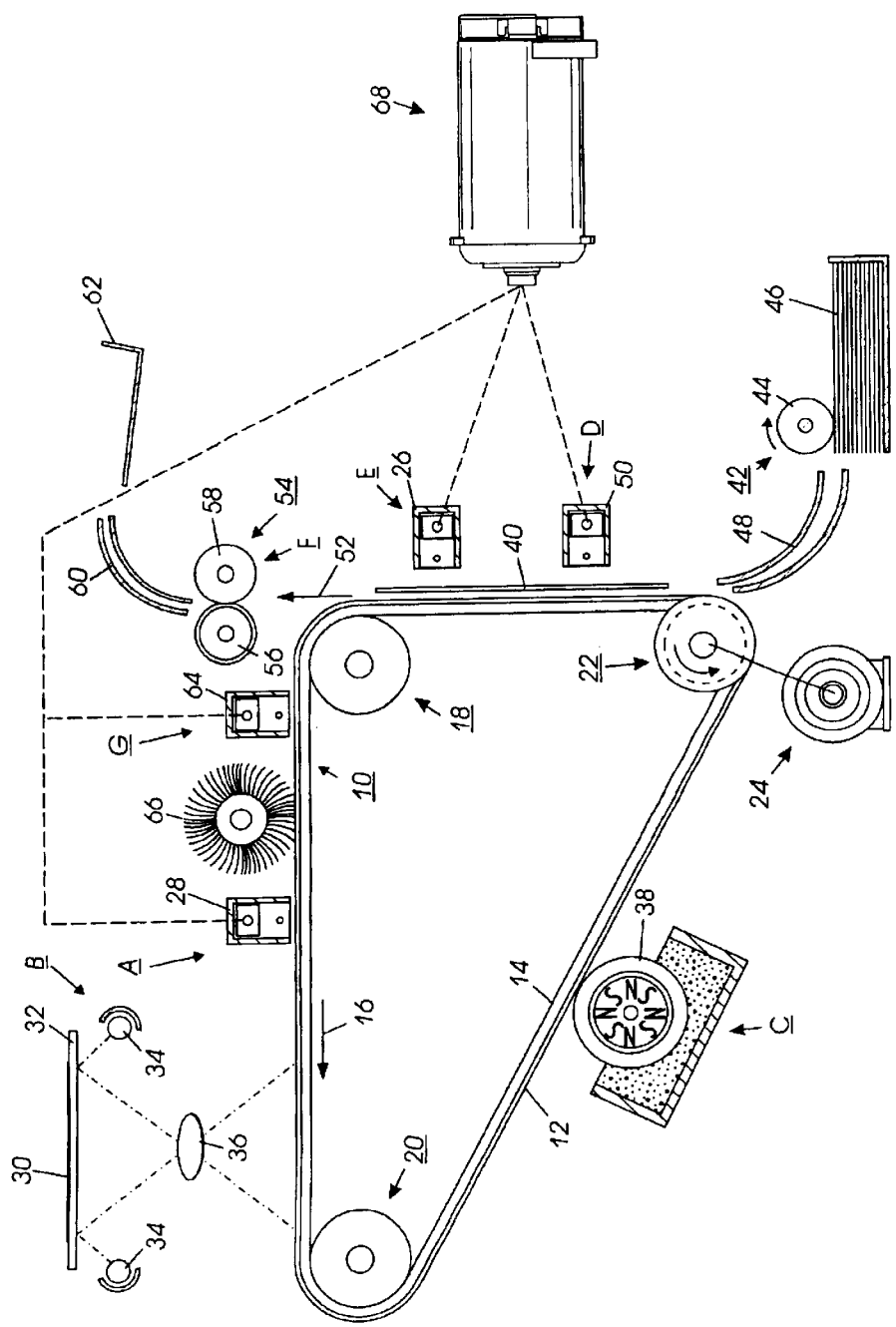
FIG. 1 is a schematic view of a representative electrographic copying machine incorporating an ozone catalytic converter unit according to the present invention.

FIG. 1 schematically depicts the various components of an illustrative electrostatographic copying machine incorporating the present filter/catalytic converter apparatus for the collection and removal of dirt as well as ozone and other noxious gases. However, it will become evident from the following discussion that the apparatus for the collection and removal of dirt, ozone and other noxious gases is equally suited for use in a wide variety of devices and is not necessarily limited in its application to the particular embodiment shown herein.

As shown in FIG. 1, the electrostatographic copying machine employs a belt 10 having a photoconductive surface 12 deposited on a conductive substrate 14. Preferably, photoconductive surface 12 is made from a selenium alloy with conductive substrate 14 being made from an aluminum alloy. Belt 10 moves in the direction of arrow 16 to advance successive portions of photoconductive surface 12 sequentially through the various processing stations disposed about a path of movement thereof. Belt 10 is entrained about stripping roller 18, tension roller 20 and drive roller 22 which is itself driven by motor 24.

The various processing stations employed in the illustrated copying machine will be now briefly described. Initially, a portion of the belt 10 passes through a charging station A. At charging station A, a corona generating or discharging device, indicated generally by the reference 28, charges photoconductible surface 12 of belt 10 to a relatively high, substantially uniform potential. The corona discharging device 28 will be described in detail in connection with FIGS. 2 to 4 below.

Next, the charged portion of photoconductive surface 12 is advanced through exposure station B. At exposure station B, an original document 30 is positioned face down upon transparent platen 32. Lamps 34 flash light rays onto original document 30. The light rays reflected from original document 30 are transmitted through lens 36 forming a light image thereon. The light image is projected onto the charged portion of photoconductive surface 12 to selectively dissipate the charge thereon. This records an electrostatic latent image on photoconductive surface 12 which corresponds to the informational areas contained within original document 30.

Thereafter, belt 10 advances the electrostatic latent image recorded on photoconductive surface 12 to development station C. At development station C, a magnetic brush developer roller 38 advances a developer mix into contact with the electrostatic latent image. The latent image attracts the toner particles from the carrier granules forming a toner powder image on photoconductive surface 12 of belt 10.

Belt 10 then advances the toner powder image to transfer station D. At transfer station D, a sheet of support material 40 is moved into contact with the toner powder image. The sheet of support material is advanced to transfer station D by a sheet feeding apparatus 42. Preferably, sheet feeding apparatus 42 includes a feed roller 44 contacting the upper sheet of stack 46. Feed roller 44 rotates so as to advance the upper most sheet from stack 46 into chute 48. Chute 48 directs the advancing sheet of support material into contact with the photoconductive surface 12 of belt 10 in a timed sequence so that the toner powder image developed thereon contacts the advancing sheet of support material at transfer station D.

Transfer station D includes a corona discharging device 50 which sprays ions onto the back side of sheet 40. This attracts the toner powder image from photoconductive surface 12 to sheet 40. After transfer, the sheet 40 advances to detack station E. At detack station E, a corona discharging device 26 charges the back side of the sheet 40 so as to facilitate the separation of the sheet 40 and the toner powder image thereon from the photoconductive surface 12. After the detack station E, the sheet continues to move in the direction of arrow 52 onto a conveyor (not shown) which advances the sheet to fusing station F.

Fusing station F includes a fuser assembly, indicated generally by 54, which permanently affixes the transferred toner powder image to sheet 40. Preferably, fuser assembly 54 includes a heated fuser roller 56 and a backup roller 58. Sheet 40 passes between fuser roller 56 and backup roller 58 with the toner powder image contacting fuser roller 56. In this manner, the toner powder image is permanently affixed to sheet 40. After fusing, chute 60 guides the advancing sheet 40 to catch tray 62 for removal from the copying machine by the operator.

Invariably after the sheet of support material is separated from photoconductive surface 12 of belt 10, some residual particles remain adherent thereto. These residual particles are removed from photoconductive surface 12 at cleaning station G. Cleaning station G includes a preclean corona discharging device 64 and a rotatably mounted fibrous brush 66 in contact with photoconductive surface 12. The preclean corona discharging device 64 neutralizes any remaining electrostatic charge carried by the residual particles and they are then removed or cleaned from photoconductive surface 12 by the rotation of brush 66 in contact therewith. Subsequent to cleaning, a discharge lamp (not shown) floods photoconductive surface 12 with light to dissipate any residual electrostatic charge remaining thereon prior to the charging thereof from the next successive imaging cycle.

As can be gathered from the above description, there are four separate stations where corona discharging devices are employed in this illustrative electrostatographic copying machine, and where there is a need for the collection and removal of ozone and; other noxious gases generated by such corona discharge devices. In accordance with the present invention, the ozone and other noxious gases, as well as any dirt particles or contaminants, are collected at these corona discharge devices, and are passed on through conduits (shown as dotted lines in FIG. 1) to a dirt pre-filter/ozone catalytic converter unit 68 according to the present invention, as more fully illustrated by FIGS. 2 to 4 of the drawings.

Figure 2:
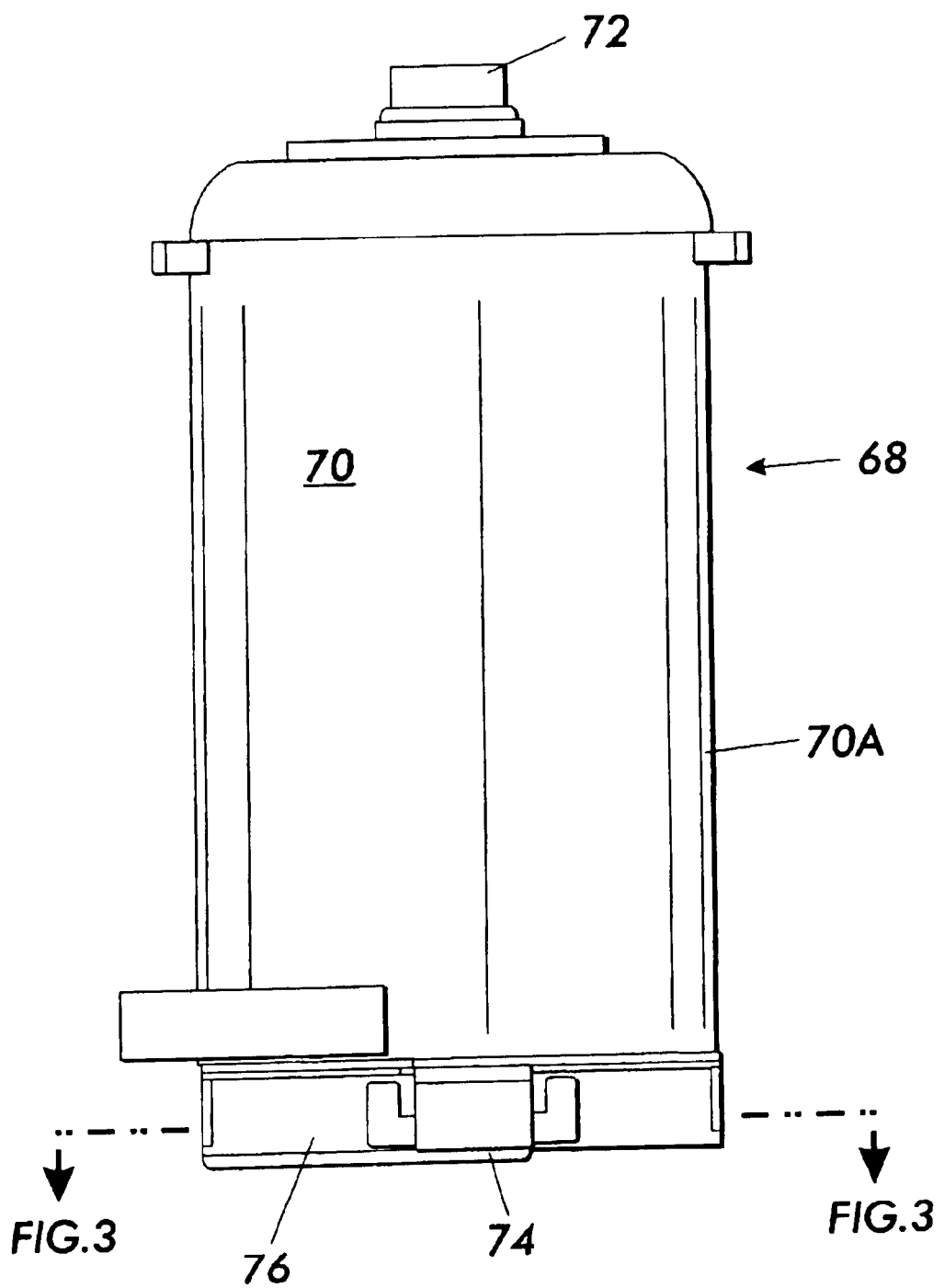
FIG. 2 is an elevational view of a catalytic converter unit according to the present invention.
Figure 3:
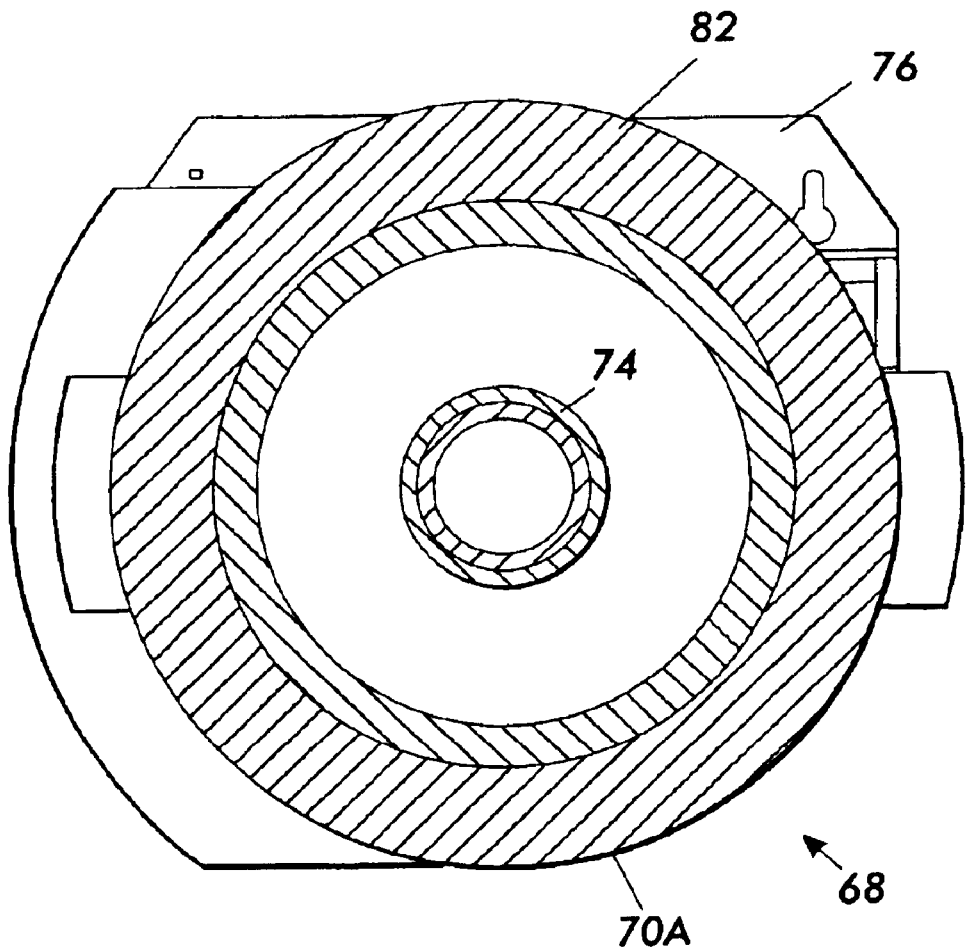
FIG. 3 is an end view of the unit of FIG. 2, taken along the line 3—3 thereof.

Referring to FIGS. 2 and 3, the unit 68 illustrated thereby is a cylindrical housing 70 having an inlet fitting 72 for receiving dirty ozoned air from the corona discharge stations of the copy machine, and a discharge outlet 74 at the downstream end of the unit for discharging the air exiting the interior surface 93 of the catalyst bed 90 after it has been freed of dirt and ozone and other impurities.

The unit 68 is mounted on the frame of the copy machine in a convenient location, such as by means of a rear bracket 76, and the outlet 74 may be connected to a vent means.

Figure 4:
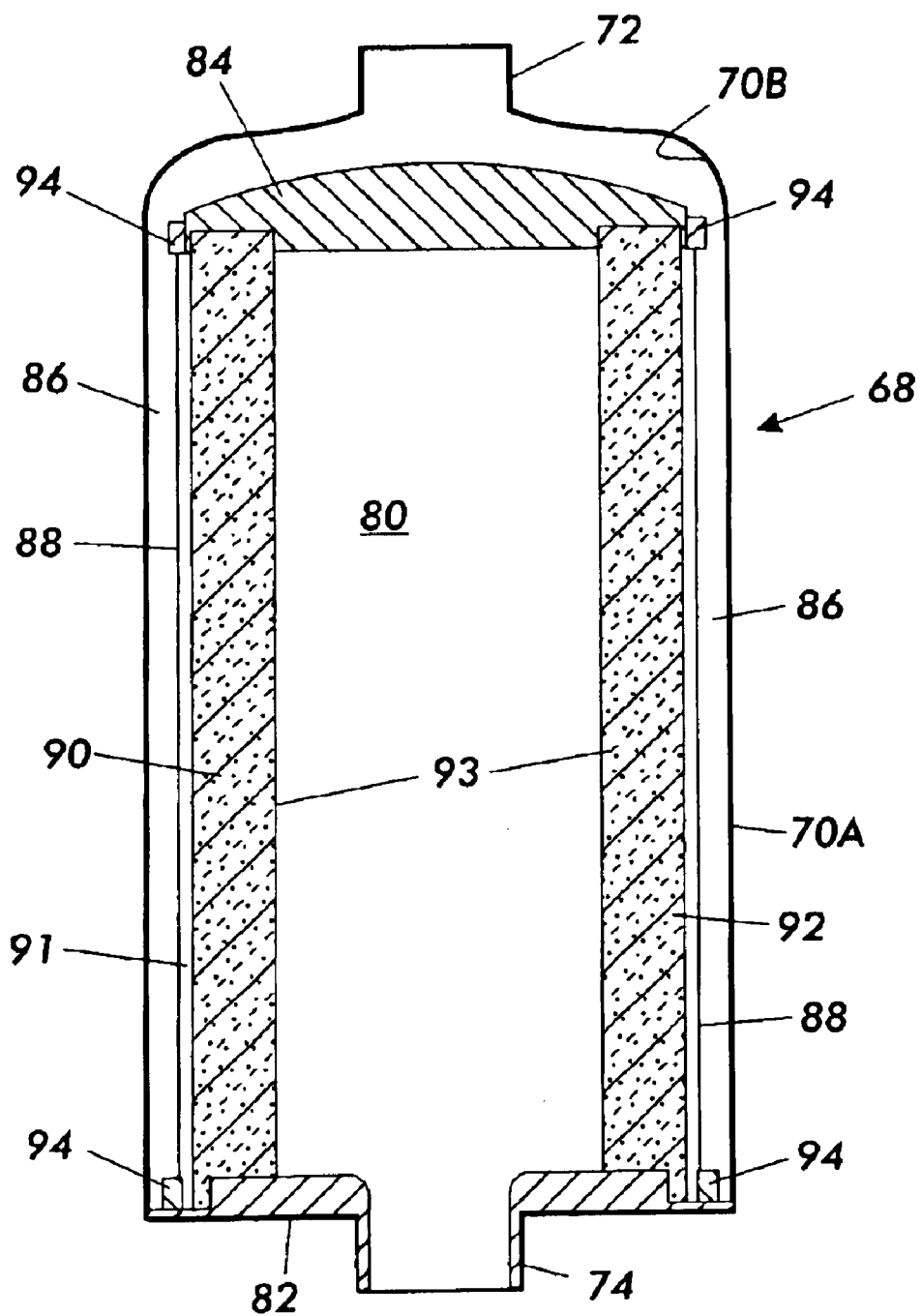
FIG. 4 is an axial cross-sectional view of the ozone catalytic converter unit of FIGS. 2 and 3.

Referring to the cross-sectional view of FIG. 4, the housing 70 of the present catalytic converter unit 68 comprises a shell or casing 70A which is easily removable and which encloses a filter/catalyst cylindrical member 80 which is fixed to an end cap 82 of the unit 68, or otherwise supported with its outer surface closely spaced from the inner surface of the housing 70 of unit 68 to form an annular space or passage 86 therebetween. The end of the filter catalyst member 80, adjacent the unit inlet fitting 72, is sealed by a domed cap 84 having an aerodynamic outer surface which uniformly distributes the dirty inlet gas radially-outwardly into the annular passage 86 where its only escape to outlet 74 is through the filter/catalyst member 80. The outer shell or casing 70A of the housing 70 has an inner surface 70B, and may be threadably or frictionally engaged on the end cap 82 so as to be easily removable, without tools, to provide access to the filter/catalyst member 80.

The preferred novel filter/catalyst member 80 comprises an outer dirt filter screen sleeve 88 which completely surrounds the inner tubular bed 90 of granular catalyst confined between an enclosure unit comprising inner and outer air-permeable sleeves 92. The filter screen sleeve 88 is removably supported in spaced relation to the outer retaining sleeve 92 of the catalyst bed 90, such as by means of confinement between end bushings 94, so that the filter screen sleeve 88 can be removed for periodic cleaning or replacement, as necessary.

A preferred dirt filter screen sleeve 88 is a fine mesh screen of polytetrafluoroethylene (PTFE) which filters out and traps dirt and contaminant particles of 1 micron size or larger and precludes them for contacting and poisoning the catalyst, which is widely known to be the principal cause of failure of catalytic converters. The present design enables the catalyst bed to be effective for the life of the apparatus by shielding it against contact with dirt and other contaminants, and by enclosing the filter/catalyst member 80 within an outer cylindrical housing shell or casing 70A which is easily removable from the housing base or end cap 82 to facilitate the removal of the dirt filter sleeve 88 for periodic cleaning and replacement, to preserve the useful life of the catalyst.

According to a preferred embodiment of the invention, the present catalyst bed 90 comprises a compacted bed of fine granular ozone-decomposing catalyst particles which convert ozone gas to harmless oxygen gas upon contact. The granular bed is confined in an enclosure unit or retaining screen assembly 91 comprising the inner and outer gas-permeable sleeves 92, such as stainless steel woven wire cloth of 16×16 mesh, 0.023" diameter wire, 0.04" width openings, 39.9% open area.

Filling of the catalyst screen assembly 91 is accomplished by filling the space between the screen sleeves 92 with catalyst granules, vibrating at 100 to 200 cycles/min. for about 30 seconds at 1.3 to 1.6 amplitude to cause compacting or settling of the granules, and repeating the process until no further settling occurs.

The catalytically active granular material suitable for use in the apparatus and method of the instant invention can be virtually any material disclosed in the art which is capable of conversion of ozone or other dangerous gas to relatively innocuous products. Typical catalytically active ozone-neutralizing materials which are suitable for this purpose include those substances which have been historically termed "hopcalites".

Briefly, these catalysts comprise metal oxides or basic sulfates, acetates or carbonates of the more common metals, either alone or in admixture. These substances are prepared under conditions intended to produce a finely divided granular material. Among the metals whose oxides, basic carbonates, basic acetates and basic sulfates have been found to be catalytically active are: manganese, cobalt, copper, iron, nickel, bismuth, lead and silver. In practice, mixtures of two or more of the above materials are preferable to a single compound acting alone. Moreover, catalytic activity of these compounds or mixtures of these compounds can be further enhanced by the addition of very minor quantities of finely divided metals, particularly metals of the platinum group, (these metals being regarded as promoters).

While the preferred two-stage filter device is an ozone gas catalytic converter, it should be understood that the present design can be used with any two-stage air/gas treatment device in which it is desirable to pre-filter the air/gas in advance of catalytic treatment to remove odor, poisonous gases and/or other objectionable or unwanted gases.

While the invention has been described in detail with reference to specific preferred embodiments, it will be appreciated that various modifications may be made from the specific details without departing from the spirit and scope of the invention.

What is claimed is:

1. A catalytic converter unit for pre-filtering dirt particles from a gas discharge containing an objectionable gas which is neutralizable to render it non-objectionable, which comprises an elongate housing having an upper portion having an inlet for admitting said gas discharge and having a lower base portion having an outlet for releasing neutralized gas; a cylindrical catalyst bed element of annular cross-section comprising a gas permeable wall of granular catalyst particles enclosed within inner and outer gas-permeable retaining screens forming a retaining unit, attached to said base portion and centered within said housing to provide an annular gas, inlet chamber therebetween, said catalyst bed element being removable from said catalytic converter unit to permit replacement of said qranular catalyst particles, and forming an annular gas-permeable wall surrounding a central gas-discharge chamber, sealed by a domed cap, and opening to said outlet for releasing neutralized gas, said domed cap being at the top of said cylindrical catalyst bed element and enclosing said central gas discharge chamber, a cylindrical dirt filter screen having a dirt-trapping mesh which filters out and traps dirt particles of 1 micron size or larger, said cylindrical screen being closely-spaced from and enclosing said cylindrical catalyst bed element, within said annular chamber, whereby said gas discharge introduced through said inlet passes through said annular chamber and through said dirt filter screen to remove dirt particles therefrom in advance of passage of said gas discharge through said catalyst bed element, to neutralize any objectionable gas present in said discharge prior to entry to said central gas discharge chamber and release through said outlet.

2. A catalytic converter unit according to claim 1 in which said lower base portion is removably-attached to said housing to provide access to the catalyst bed element and to the dirt filter screen for cleaning and/or replacement purposes.

3. A catalytic converter unit according to claim 1 in which said dirt filter screen comprises a screen of polytetrafluoroethylene which filters out and traps dirt and other contaminant particles of 1 micron size or larger.

\* \* \* \* \*